Patented Feb. 28, 1928.

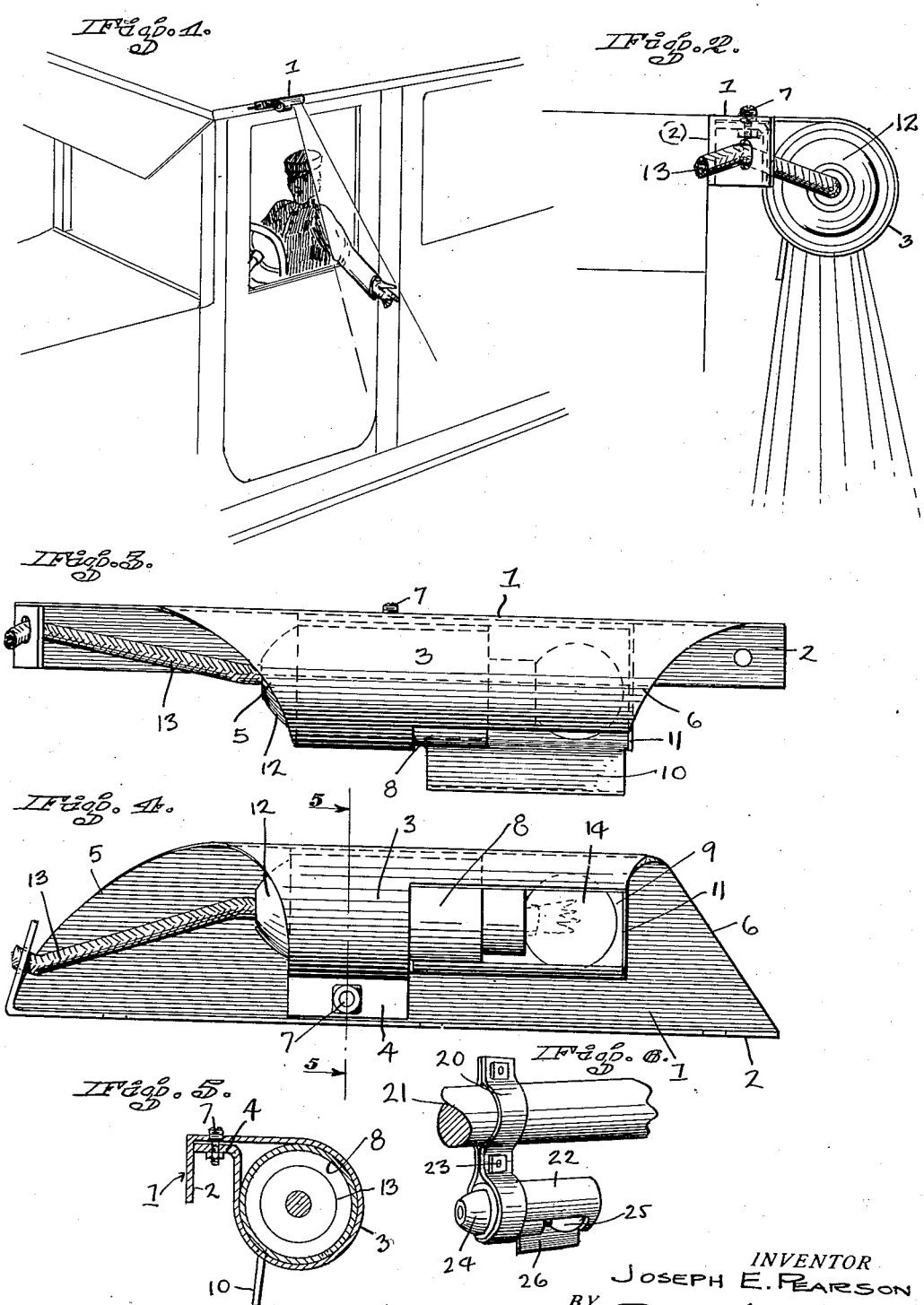

1,660,523

UNITED STATES PATENT OFFICE.

JOSEPH E. PEARSON, OF RICHMOND, CALIFORNIA.

LIGHTING DEVICE FOR VEHICLES.

Application filed December 20, 1926. Serial No. 156,005.

This invention relates particularly to a lighting fixture to be mounted on the side of a vehicle to illuminate the side of said vehicle and to provide a beam of light into which a vehicle operator may extend an arm to indicate a course of movement to be pursued by said vehicle.

An object of the invention is to provide a lighting fixture for vehicles adapted to function as passing light with reference to approaching vehicles, as a spotlight to illuminate the road surface adjacent the vehicle, to thereby assist the vehicle operator when stepping onto said road surface, and to furnish a zone of light to assist the vehicle operator in giving directions of travel of the said vehicle.

A further object of the invention is to provide a lighting fixture for vehicles in which the zone of light to be generated by the fixture may be controlled and regulated. A further object of the invention is to provide a lighting fixture for vehicles that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms, and it is also to be understood that in and by the claims following the description it is desired to cover the invention in whatsoever form it may be embodied.

In the accompanying one sheet of drawings,

Fig. 1 represents a perspective view of a vehicle having a lighting fixture mounted thereon constructed in accordance with my invention.

Fig. 2 is an enlarged front end elevation of my lighting fixture applied in operative position to the side of the vehicle.

Fig. 3 is a front side elevation of my signalling device.

Fig. 4 is a bottom view of Fig. 3.

Fig. 5 is a section taken through Fig. 4 on the line 5—5.

Fig. 6 is a modified form of the invention to be used in attaching it to the frame of open vehicles.

The lighting fixture which I have developed is primarily adapted to assist vehicle operators in night driving to sufficiently illuminate one side of the driven vehicle to serve as a warning to approaching vehicles and also to provide a zone of light into which the vehicle operator may extend an arm when indicating a change of course in the direction of movement of the driven vehicle.

In detail, the construction illustrated in the drawings comprises a bracket 1, having a flanged edge 2 that is adapted to be screwed onto the outside of a vehicle. The bracket is preferably arranged on the side of the vehicle, near the top thereof, and above the window or door opposite the vehicle driver's compartment. The bracket 1 is provided with a mediate portion 3 that is bent back upon itself and the end 4 of the bent portion extended in and under the bottom of the bracket 1. The opposite ends 5 and 6 of the bracket are curved on an acute angle to provide a surface that will not catch or hold leaves or branches therein or to prevent the engagement of the bracket with the objects which might cause the fixture to be forcibly disengaged from the vehicle body. The inturned end 4 of the mediate portion 3 of the bracket is clamped to the bracket by means of a screw bolt 7, so as to hold the end of the mediate portion 3 in adjustable relationship to the bracket 1. A tubular casing 8 is adapted to be clamped to the inside of the bracket 1 by the inturned mediate portion 3 thereof, and the casing 8 is provided with an aperture 9 through the side and adjacent an end thereof. The material cut from the casing 8 to form the aperture 9 is bent downwardly at 10 to form a deflecting shield to be hereinafter described in detail. The end of the casing 8 is closed at 11 to prevent any light generated within the casing 8 from being thrown outward toward the rear of the vehicle on which the bracket is attached. The opposite end of the casing 8 is open. A lamp socket 12 is secured in the open end of the casing 8, and said lamp socket 12 is connected by an electric current carrying wire 13 to a source of electrical supply (not shown). An electric lamp bulb 14 is mounted within the casing 8, and secured to the socket 12, the bulb 14 being positioned in the casing 8 in registry with the aperture 9 therein. When the bulb 14 is illuminated, the light from the bulb is directed downwardly and outwardly according to the position in which the casing 8 is arranged relative to the supporting bracket 1. The deflecting plate 10 serves to control the downward path of the beam of light generated by the bulb 14, and to permit the beam of light being thrown relatively toward or from the side of the vehicle. The path of the beam of light is regulated by unloosening the screw 7 on the bracket 1 to permit the casing 8 to be partially rotated in its clamped support and the deflecter plate 10 placed in the selected position after which the clamping bolt 7 is tightened and the casing 8 held in the desired location. The deflector plate 10 causes the beam of light to be directed downwardly along the side of the machine and prevents the beam of light from passing into the driver's compartment. The beam of light is sufficient to illuminate the side of the machine as a warning to approaching vehicles, and also illuminates the road surface adjacent the side of the machine to assist the driver in stepping into or out of the vehicle, and it also provides an area of light into which the arm of the vehicle operator may be extended so that at night time an adequate warning or indication of a change of course of the driven vehicle will be given to the driver of following vehicles.

The type of device shown in the first six figures of the drawing is adaptable particularly to closed cars. In applying the apparatus to an open car or one having a demountable top, I provide a piece of material bent back upon itself so that the opposite ends 20 thereof may be clamped around a bar 21 in the vehicle top. The lamp casing 22 would be clamped in the bent portion of the bracket and held in the desired position by means of a clamping screw 23. The lamp casing 22 would be provided with a lamp socket 24, lamp 25 and deflector plate 26 therein, to function in the identically same manner as the casing described in the preferred embodiment of the invention.

Having thus described this invention, what I now claim and desire to secure by Letters Patent is:

1. A lighting fixture comprised of a plate having a mediate portion of the plate bent to form a loop between the ends of said plate; means to hold the looped portion of the plate in yieldable engagement wth the plate; a casing, movably secured in the looped portion of the plate, having an aperture cut therein and the material forming the aperture bent outward to form a light deflecting surface; and an electric lamp bulb mounted in the casing, opposite the aperture, adapted to have the beam of light therefrom deflected by the light deflecting surface.

2. A lighting fixture comprised of a plate having a mediate portion of the plate bent to form a loop between the ends of said plate; means to hold the looped portion of the plate in yieldable engagement with the plate; a casing, movably secured in the looped portion of the plate, having an aperture cut therein and the material forming the aperture bent outward to form a light deflecting surface; and an electric lamp bulb mounted in the casing opposite the aperture, adapted to have the beam of light therefrom deflected by the light deflecting surface, said plate having the opposite edges thereof curved to ward off encountered objects.

In testimony whereof, I have hereunto set my hand at San Francisco, California, this 23rd day of July, 1926.

JOSEPH E. PEARSON.